United States Patent
Giuntini

(10) Patent No.: US 11,205,952 B2
(45) Date of Patent: Dec. 21, 2021

(54) METHODS AND SYSTEMS FOR CONTROLLING CURRENT SOURCE RECTIFIERS

(71) Applicant: ABB Schweiz AG, Baden (CH)

(72) Inventor: Lorenzo Giuntini, Locarno (CH)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/800,279

(22) Filed: Feb. 25, 2020

(65) Prior Publication Data
US 2020/0195130 A1  Jun. 18, 2020

Related U.S. Application Data

(63) Continuation of application No. 15/955,077, filed on Apr. 17, 2018, now Pat. No. 10,574,136.

(51) Int. Cl.
*H02M 1/42* (2007.01)
*H02M 7/219* (2006.01)
*H02M 1/12* (2006.01)
*H02J 9/06* (2006.01)

(52) U.S. Cl.
CPC ......... *H02M 1/4216* (2013.01); *H02M 1/126* (2013.01); *H02M 7/219* (2013.01); *H02J 9/061* (2013.01); *Y02B 70/10* (2013.01)

(58) Field of Classification Search
CPC .. H02M 1/126; H02M 1/4216; H02M 1/4208; H02M 1/4233; H02M 7/217; H02M 7/219; H02M 7/125; H02M 7/04; H02M 7/162; H02M 1/1623; H02M 7/155; H02M 1/08; H02M 1/081; H02M 2001/0054; H02M 2001/0019; Y02B 70/126; H02J 9/061
See application file for complete search history.

(56) References Cited

U.S. PATENT DOCUMENTS

| 5,345,375 | A | 9/1994 | Mohan |
| 8,223,511 | B2 | 7/2012 | Cheng et al. |
| 8,873,261 | B1 | 10/2014 | Cuzner |

(Continued)

OTHER PUBLICATIONS

Changjin Liu, Dehong Xu, Li Jun ; Three-phase Current-Source Buck Type PFC Converter with Reverse-Blocking IGBTs; 2007ieee.*

(Continued)

*Primary Examiner* — Gustavo A Rosario-Benitez
(74) *Attorney, Agent, or Firm* — Armstrong Teasdale LLP

(57) ABSTRACT

Current source rectifier (CSR) systems and methods for a power source including three phase lines are disclosed. One illustrative CSR system includes a rectifier operable to receive an AC input voltage and provide a DC output voltage and a controller communicatively coupled to the rectifier. The rectifier comprises first, second, and third phase legs including a plurality of switches with each switch coupled to an associated phase line of the three phase lines. The controller is operable to (i) control operation of the plurality of switches in accordance with a first switching sequence when measured input voltages on at least two phase lines of the three phase lines are outside of the predetermined voltage range and (ii) control operation of the plurality of switches in accordance with a second switching sequence when the measured input voltages on the at least two phase lines are within the predetermined voltage range.

20 Claims, 6 Drawing Sheets

(56) References Cited

U.S. PATENT DOCUMENTS

| | | | |
|---|---|---|---|
| 8,947,897 B2 | 2/2015 | Yamanaka | |
| 9,001,542 B2 | 4/2015 | Takatsuka et al. | |
| 9,240,732 B2 | 1/2016 | Cuzner et al. | |
| 9,270,198 B2 | 2/2016 | Tolbert et al. | |
| 9,774,246 B2 | 9/2017 | Wang et al. | |
| 10,574,136 B2 | 2/2020 | Giuntini | |
| 2008/0219036 A1 | 9/2008 | Colombi et al. | |
| 2013/0127361 A1 | 5/2013 | Weng | |
| 2013/0314953 A1 | 11/2013 | Cuzner et al. | |
| 2015/0124505 A1 | 5/2015 | Fei et al. | |
| 2015/0171663 A1 | 6/2015 | Krstic et al. | |
| 2016/0380429 A1* | 12/2016 | Krstic | H02H 7/125 |
| | | | 307/77 |
| 2017/0229972 A1 | 8/2017 | Cerqueira Pinto Bezerra Varaj O et al. | |
| 2017/0279370 A1 | 9/2017 | Zhao et al. | |
| 2018/0262103 A1* | 9/2018 | Afsharian | H02M 1/4233 |
| 2018/0316257 A1* | 11/2018 | Cuzner | H02M 7/217 |
| 2019/0245432 A1* | 8/2019 | Yan | H02J 7/00 |

OTHER PUBLICATIONS

Baumann et al., "Comparative evaluation of modulation methods for a three-phase/switch buck power factor corrector concerning the input capacitor voltage ripple", PESC 2001.

Halkosaari et al., "Optimal vector modulation of a PWM current source converter according to minimal switching losses", PESC 2000.

Nussbaumer et al., "Improving mains current quality for three-phase three-switch buck-type PWM rectifiers", IEEE, Trans. on Power El. 21(4), Jul. 2006.

Guo et al., "Compensation of input current distortion in three-phase buck rectifiers", APEC 2013.

Li et al., "Space vector sequence investigation and synchronization methods for active front-end rectifiers in high-power current-source drives", IEEE, Trans, on Ind. Ele. 55(3), Mar. 2008.

Bierhoff et al., "Semiconductor losses in voltage source and current source IGBT converters based on analytical derivation", PESC 2004.

International Search Report and Written Opinion issued in related PCT/EP2019/059924, dated Jul. 24, 2019, 11 pages.

* cited by examiner

METHODS AND SYSTEMS FOR CONTROLLING CURRENT SOURCE RECTIFIERS

CROSS-REFERENCE TO RELATED APPLICATION

This application is a continuation of U.S. patent application Ser. No. 15/955,077, filed Apr. 17, 2018, now U.S. Pat. No. 10,574,136, the entire disclosure of which is incorporated herein by reference.

TECHNICAL FIELD

The field of the invention relates generally to current source rectifiers (CSRs), and more particularly, to methods and control systems for controlling active rectifiers in CSR systems.

BACKGROUND

CSRs are commonly used in a variety of applications, such as in uninterruptible power supplies (UPSs), telecommunication and data centers, electric motors, etc., because of their ability to operate the CSR at unity power factor with sinusoidal AC currents. At the same time, efficiency is a fundamental criterion that is considered during selection of a CSR system. Therefore, reduction of losses is an important factor for successful market adoption of current source conversion technology.

There are two desirable, but competing, parameters associated with CSRs: high efficiency and low current distortion. Reducing switching losses by using some known modulation sequences introduces undesirable side effects in terms of input current distortion. Other known solutions, for example, increasing input filter capacitance or increasing the switching frequency, are not of practical use and may compromise cost/footprint or performance.

BRIEF DESCRIPTION

A current source rectifier (CSR) system for a power source including three phase lines is provided herein. The CSR includes a rectifier having a plurality of switches, each switch of the plurality of switches coupled to an associated phase line of the three phase lines. The rectifier operable to receive an alternating current (AC) input voltage and provide a direct current (DC) output voltage. The CSR also includes a controller configured to control operation of the switches in accordance with a first switching sequence when measured input voltages on at least two phase lines of the three phase lines are outside of a predetermined voltage range, and control operation of the switches in accordance with a second switching sequence when the measured input voltages on the at least two phase lines are within the predetermined voltage range. The CSR system includes a rectifier having a plurality of switches, each switch of said plurality of switches coupled to one phase line of three phase lines of a power source for receiving an alternating current (AC) input voltage and providing a direct current (DC) output voltage. The CSR system also includes a controller configured to control operation of the switches in accordance with a first switching sequence based on a comparison of measured input voltages on at least two phase lines of the three phase lines, and control operation of the switches in accordance with a second switching sequence when the measured input voltages on the at least two phase lines are within a predetermined voltage range.

A method of controlling a current source rectifier (CSR) that includes a controller and a rectifier having a plurality of switches is provided. Each switch is coupled to an associated phase line of three phase lines of a power source. The method includes receiving, by the rectifier, three-phase alternating-current (AC) voltages from the power source. The method also includes controlling, by the controller, operation of the plurality of switches in accordance with a first switching sequence when measured input voltages on at least two phase lines of the three phase lines are outside of a predetermined voltage range. The method further includes controlling, by the controller, operation of the plurality of switches in accordance with a second switching sequence when the measured input voltages on the at least two phase lines are within the predetermined voltage range.

DETAILED DESCRIPTION

Figure 1:
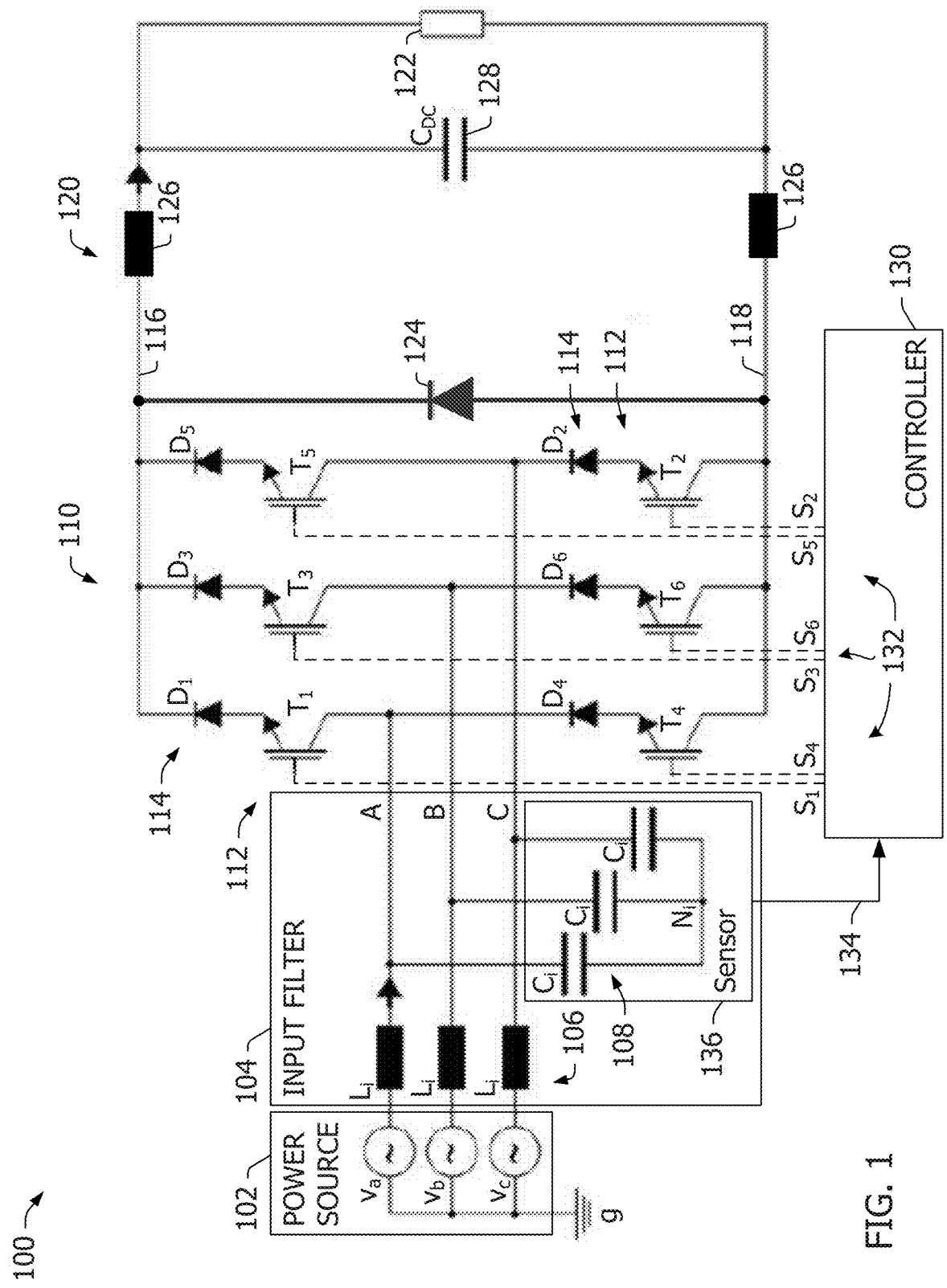
FIG. 1 is a circuit diagram of an exemplary three-phase current source rectifier (CSR).

FIG. 1 is a circuit diagram of an exemplary three-phase current source rectifier (CSR) 100. As shown in FIG. 1, CSR 100 is a buck-type pulse-width-modulated (PWM) rectifier CSR 100 is coupled to a power source 102 that generates three alternating current (AC) input voltages $v_a$, $v_b$, and $v_c$ relative to a ground connection g. AC input voltages $v_a$, $v_b$, and $v_c$ are provided to CSR 100 via three phase lines A, B, C, respectively. In the exemplary embodiment, power source 102 is a three-phase AC voltage source such as a grid or utility. However, in alternative embodiments, power source 102 may provide single-phase or multi-phase power to CSR 100.

CSR 100 includes an input filter 104 coupled to power source 102. Input filter 104 includes an input filtering inductor 106 $L_i$ coupled on each phase line A, B, C and an input filter capacitor 108 $C_i$, coupled between respective phase lines A, B, C and a mid-point node $N_i$. Input filter 104 is configured to prevent injection of high frequency switching harmonics by CSR 100.

In the exemplary embodiment, CSR 100 includes a rectifier 110 coupled to an output side of input filter 104. Rectifier 110 is operable to receive an alternating current (AC) input voltage and generate a direct current (DC) output voltage. Rectifier 110 is an active switching-type CSR and includes six switches 112 (T1, T2, T3, T4, T5, T6) and six diodes 114 (D1, D2, D3, D4, D5, D6) series-coupled with switches 112 T1-T6, respectively, between a positive line 116 and a negative line 118. Switches T1, T4 and diodes D1, D4 form a first phase leg of rectifier 110, which is coupled to phase line A for receiving input voltage $v_a$. Switches T3, T6 and diodes D3, D6 form a second phase leg of rectifier 110, which is coupled to phase line B for receiving input voltage $v_b$. Switches T5, T2 and diodes D5, D2 form a third phase leg of rectifier 110, which is coupled to phase line C for receiving input voltage $v_c$. Accordingly, each switch of switches 112 T1-T6 is coupled to an associated phase line of the three phase lines A, B, C. In the exemplary embodiment, switches 112 TI-T6 TO are silicon insulated-gate bipolar transistors (IGBTs). Alternatively, switches 112 T1-T6 may include bipolar junction transistors (BJTs), metal-oxide-semiconductor field effect transistors (MOSFETs), junction field effect transistors (JFETs), Gate turn-off (GTO) thyristors, integrated gate-commutated thyristors (IGCTs) or the like.

A DC link 120 is defined on positive line 116 and negative line 118 between an output of rectifier 110 and a load 122, which may be an inverter. In the exemplary embodiment, DC link 120 includes a freewheeling diode $D_f$ 124, a filter inductor $L_{DC}$ 126, and a DC link capacitor $C_{DC}$ 128. Freewheeling diode $D_f$ 124 includes a cathode coupled to positive line 116 and an anode coupled to negative line 118, and allows current to flow only from negative line 118 to positive line 116 through freewheeling diode $D_f$ 124. The presence of freewheeling diode $D_f$ 124 is optional, but when present, it operable to reduce conduction losses when regenerative capability is not necessary.

DC link capacitor $C_{DC}$ 128 is also coupled to positive line 116 and negative line 118, and is configured to filter or smooth the pulsed DC voltage output by rectifier 110. Filter inductor $L_{DC}$ 126 is coupled to both positive line 116 and negative line 118 between freewheeling diode $D_f$ 124 and DC link capacitor $C_{DC}$ 128. The filtered DC voltage is then provided to load 122.

A controller 130 is communicatively coupled to each of switches 112 T1-T6 and is operable to control operation of switches 112 T1-T6 in accordance with switching sequences based on whether measured input voltages on at least two phase lines of the three phase lines A, B, C are inside or outside of a predetermined voltage range. In the exemplary embodiment, the first switching sequence is a high-efficiency switching sequence configured to improve efficiency of CSR system 100 when the measured input voltages are outside the predetermined voltage range, and the second switching sequence is a high-quality switching sequence configured to reduce current distortion caused when the measured input voltages are within the predetermined voltage range.

In the exemplary embodiment, controller 130 includes one or more processors and associated memory as well as I/O circuits including driver circuitry for generating switching control signals 132 S1-S6 to selectively actuate switches T1-T6, respectively. Controller 130 may be implemented as any suitable hardware, processor-executed software, processor-executed firmware, programmable logic, or combinations thereof, operative as any suitable controller or regulator by which rectifier 110 is controlled according to one or more desired switching sequences.

During operation, controller 130 provides switching control signals 132 S1-S6 for causing rectifier 110 to convert AC electrical input power to provide a regulated DC current $I_{DC}$ to DC link 120. In determining a switching sequence to apply, controller 130 may employ one or more feedback signals or values 134, such as phase voltages $v_a$, $v_b$, and $v_c$ measured by at least one sensor 136 coupled across input filter capacitors 108 $C_i$ and/or the DC link current IDC and/or DC link voltage. DC-link voltage sensing is typically required for regulation, as it is the controlled output of the converter. Additionally, the DC link current IDC may be used for current-limiting operations (e.g. battery recharge) and protection schemes (e.g. converter shutdown under load side fault). Further, in some embodiments, the DC link current IDC may be used as a feed-forward term in the converter control. Controller 130 may also implement other control functions such as power factor correction.

Figure 2:
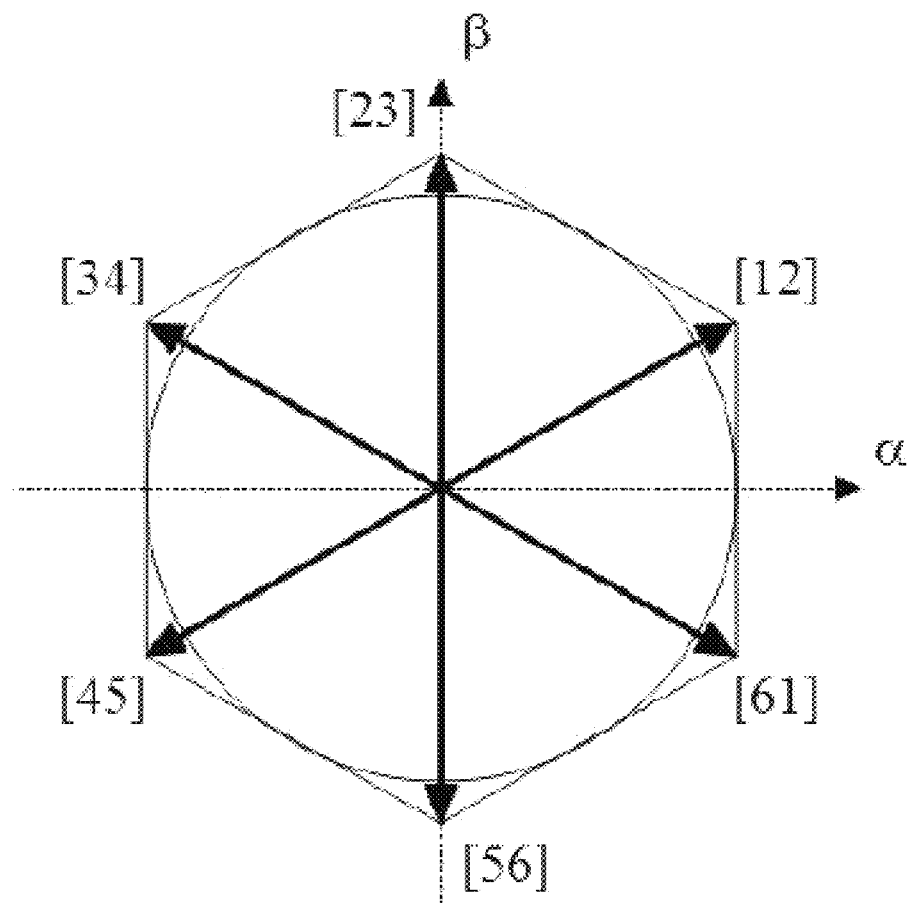
FIG. 2 is a space vector diagram for controlling the CSR shown in FIG. 1.

FIG. 2 is a space vector diagram 200 for controlling CSR 100 (shown in FIG. 1). Space vector modulation (SVM) is a common strategy for driving CSRs. In the exemplary embodiment, space vector diagram 200 is provided in a Stationary Reference Frame (SRF) and includes six phase sectors. In each phase sector, a modulation vector is synthesized by combining two adjacent vectors and a zero vector (also referred to as a freewheeling vector).

At any given time, only two switches 112 T1-T6 may conduct: one on the upper half of rectifier 110 and the other on the lower half of rectifier 110. Detailed analysis shows that when synthesizing a current vector in a given phase sector, one switch 112 (e.g., T1) remains ON, while the two opposite switches 112 (e.g., T6 and T2) on the other two legs are commutated. The applied switching sequence affects the performance of CSR 100. It should be noted that while this description focuses solely on switches 112 T1, T6, and T2 (associated with vectors [12] and [61] in FIG. 2), a substantially similar analysis and procedure may be applicable to any and all other switch combinations, and their description will not be repeated herein.

Switching losses within CSR 100 may be minimized by selecting an appropriate switching sequence. However, minimal switching loss strategies may exhibit undesirable side effects such as degradation of the input performance (mainly in terms of current distortion).

Figure 3:
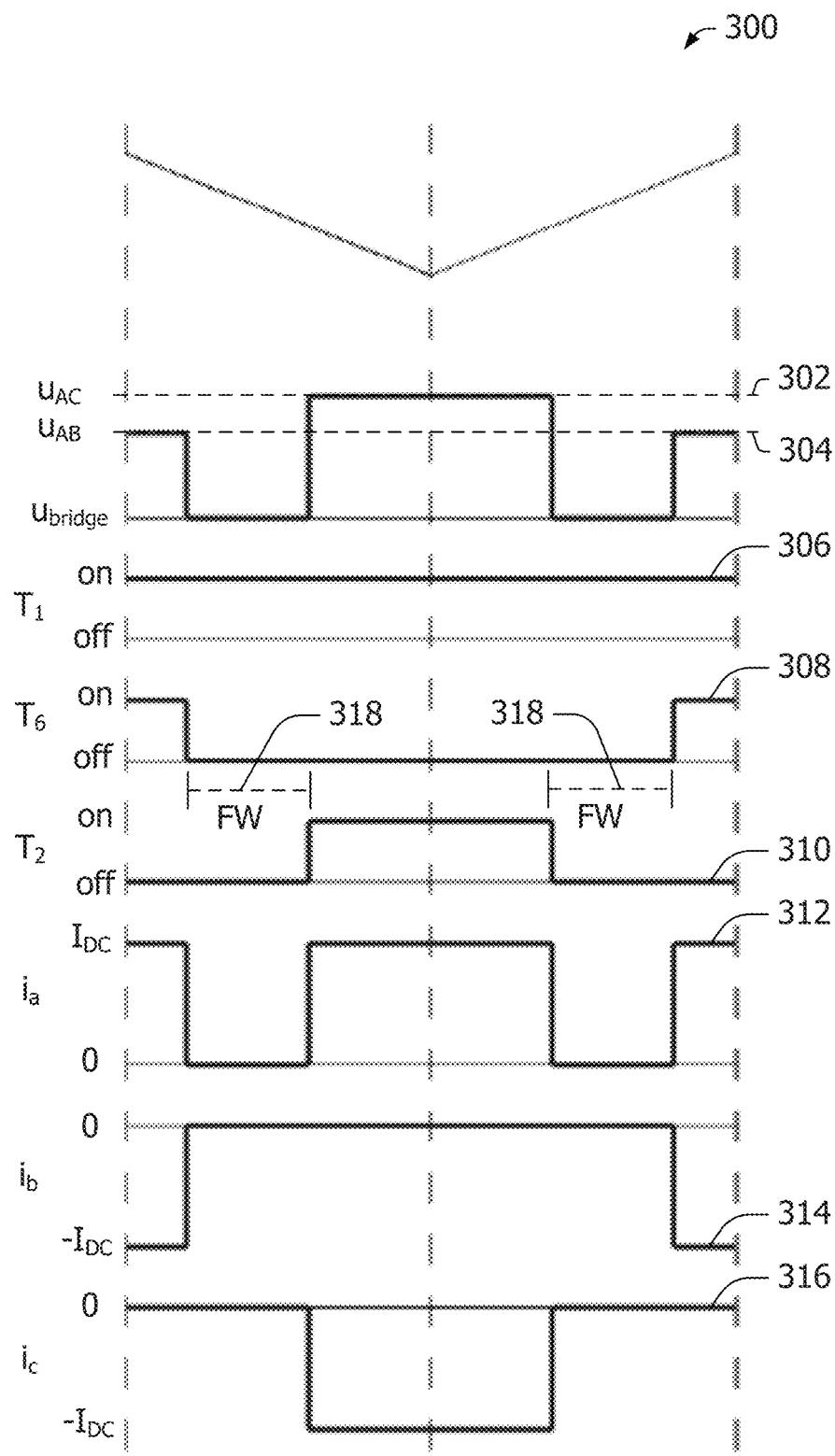
FIG. 3 illustrates a high-quality switching sequence for controlling the CSR shown in FIG. 1.

FIG. 3 illustrates a high-quality switching sequence 300 for controlling CSR 100 (shown in FIG. 1). Switching sequence 300 includes the voltage imposed by the rectifier bridge onto the DC-link (either line-line voltage 302 $U_{AC}$ measured between capacitors $C_i$ on phase lines A, C, or line-line voltage 304 $U_{BC}$ measured across capacitors $C_i$ on phase lines B, C, depending on switch state), switching state signals 306, 308, 310 for each of switches 112 TR1, TR6, TR2, respectively, and input currents 312, 314, 316 $i_A$, $i_B$, $i_C$.

In the exemplary embodiment, to apply the high-quality switching sequence 300, controller 130 generates symmetric switching pulses for the two commutated switches 112 T2 and T6 including a freewheeling state 318 following each of the symmetric switching pulses. Freewheeling states 318 occur where both switches 112 T2 and T6 are OFF. That is, a freewheeling vector is interposed between the vectors for the active switches 112 T6, T2. Each leg is locked for 60° of the phase cycle time, and so each switch 112 T1-T6 is on for 60° of the time. In the illustrated embodiment, switch 112 T1 is locked ON, while the other two switches 112 T2 and T6 are switched and commutated. Additionally, controller 130 decouples the two commutated switches 112 T2 and T6 during the freewheeling state 318 to improve a quality of the input power. Decoupling the two commutated switches 112 T2 and T6 during the freewheeling state 318 reduces current distortion near intersections of two phases of the input voltage. Further, interposing freewheeling sections 318 between pulses enables complete control of the sine wave that is going to be synthesized. This is referred to as a "high-quality" switching sequence because effectively the two switches 112 T2 and T6 are operating independently of one other. However, the "high-quality" switching sequence strategy is sub-optimal in terms of efficiency (particularly, in terms of switching losses) because each time a switch 112 is turned ON, freewheeling diode $D_f$ 124 turns ON, introducing switching losses.

Figure 4:
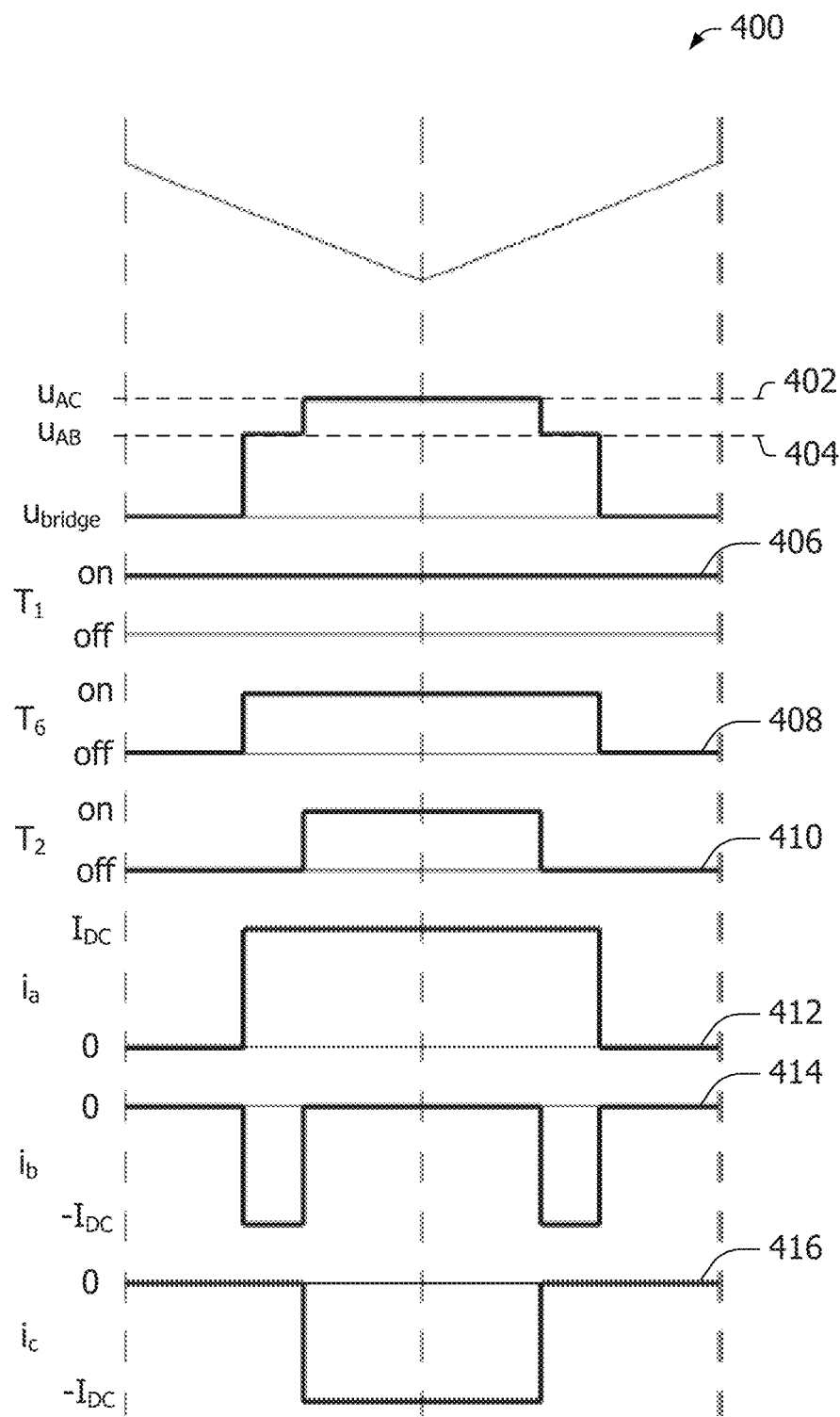
FIG. 4 illustrates a high-efficiency switching sequence for controlling the CSR shown in FIG. 1.

FIG. 4 illustrates a high-efficiency switching sequence 400 for controlling CSR 100 (shown in FIG. 1). Similarly to switching sequence 300, switching sequence 400 includes the voltage imposed by the rectifier bridge on to the DC-link (either line-line voltage 402 $U_{AC}$ measured between capacitors $C_i$ on phase lines A, C, or line-line voltage 404 $u_{BC}$ measured across capacitors $C_i$ on phase lines B, C, depending on switch state), switching state signals 406, 408, 410 for each of switches 112 T1, T6, T2, respectively, and input currents 412, 414, 416 $i_A$, $i_B$, $i_C$.

In the exemplary embodiment, controller 130 is configured to lock one switch 112 from one of the first, second, and third phase legs A, B, C in an ON position, and commutate one switch 112 from each of the two remaining phase legs. For example, in one embodiment, switch 112 T1 is locked ON, while the other two switches 112 T2 and T6 are switched and commutated.

To apply the high-efficiency switching sequence, controller 130 at least partially superimposes input voltages generated by the two commutated switches (i.e., switches 112 T2 and T6) as opposed to decoupling them. Controller 130 then determines which of the two commutated switches 112 T2 and T6 has a lower line-line voltage based on the measured input voltages, and performs all switching actions during the high-efficiency switching sequence based on the determined lower line-line voltage to facilitate operating CSR system 100 at a higher efficiency.

To apply high-efficiency switching sequence 400, controller 130 evaluates input capacitor voltage across capacitors $C_{12}$, $C_{23}$, $C_{31}$. For the two active switches 112 T6 and T2, controller 130 determines the one with the highest line-to-line voltage and the one with the lowest line-to-line voltage.

The high-efficiency modulation scheme improves efficiency by ensuring that all switching actions are performed with the minimal switched line-to-line voltage, while exposing freewheeling diode $D_f$ 124 to a single reverse-recovery event. Because switches 112 will be exposed to the lowest possible voltage, losses from freewheeling diode $D_f$ 124 are reduced and switching losses on the active switches are reduced.

However, high-efficiency switching sequence 400 suffers from power quality degradation at the sliding intersection of the input filter capacitor voltages. Due to switching ripple on input filter capacitors 108 $C_i$, the voltages across capacitors $C_i$ intersect multiple times over a switching cycle, causing associated distortion on the input current.

Figure 5:
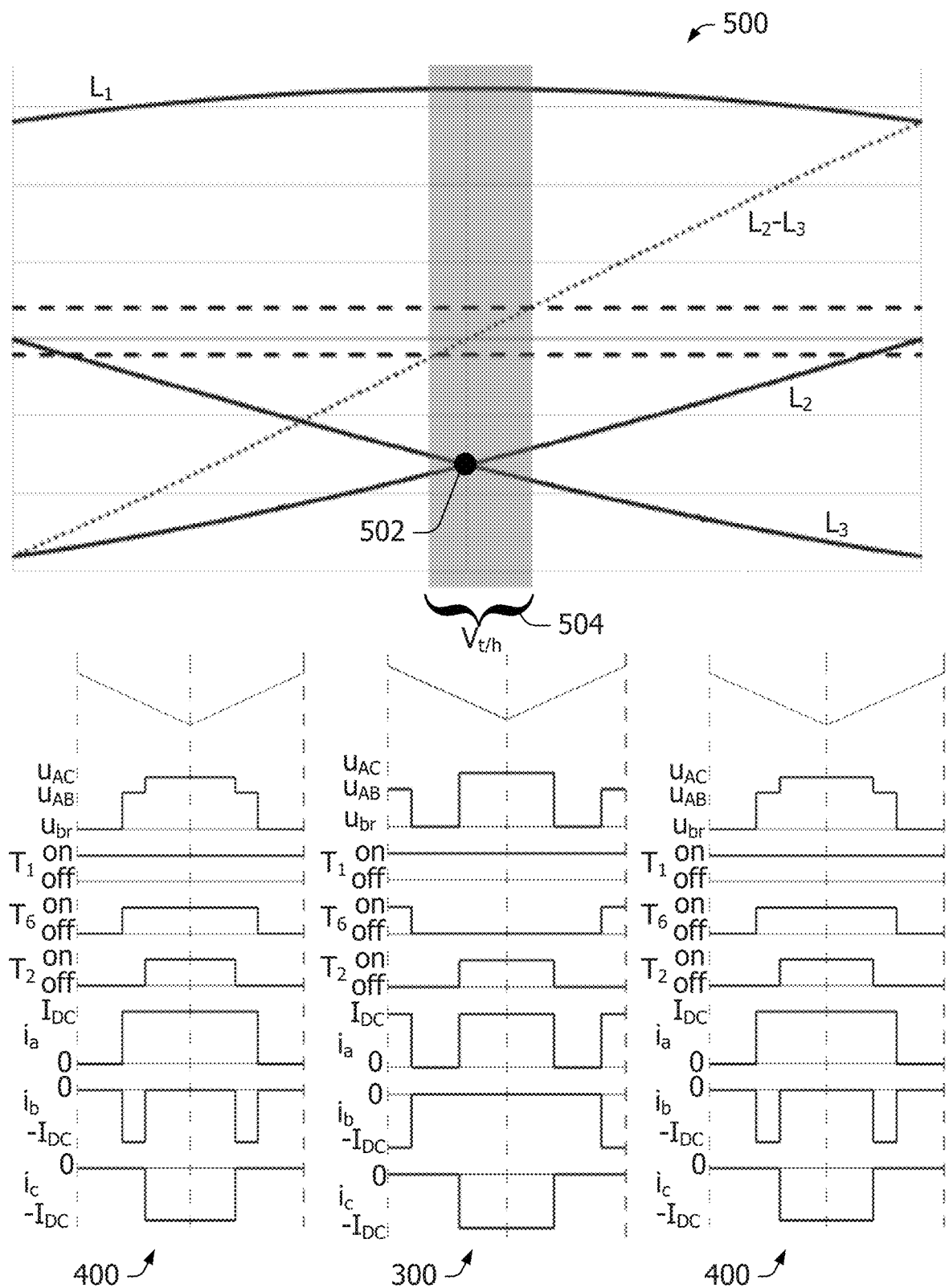
FIG. 5 illustrates an adaptive switching sequence for use in controlling the CSR shown in FIG. 1.

FIG. 5 illustrates an adaptive switching sequence 500 for use in controlling CSR 100 (shown in FIG. 1). CSR 100 is initially driven using high-efficiency switching sequence 400 (shown in FIG. 4). The line-line capacitor voltages across input capacitors $C_i$ are monitored by controller 130 (shown in FIG. 1). More specifically, controller 130 receives the measured input voltages from at least one sensor 136 coupled to the three phase lines A, B, C. Controller 130 determines whether the measured input voltages fall within a predetermined voltage range and selects which of the high-efficiency and high-quality switching sequences to apply to switches 112 T1-T6 based on the determination.

When the voltages of the two active legs T6 and T2 approach an intersection point 502 (signaled by the line-line voltages approaching zero), controller 130 changes the switching sequence being applied from high-efficiency switching sequence 400 to high-quality switching sequence 300 (shown in FIG. 3). To enable controller 130 to determine when to change the switching sequence, a predetermined voltage range 504 is defined in a memory of controller 130 using hysteresis. Predetermined voltage range 504 ensures correct selection of a switching sequence irrespective of ripple on capacitor voltage and/or line voltage distortion. After crossing intersection point 502 and exceeding predetermined voltage range 504, controller 130 changes the applied switching sequence back to high-efficiency switching sequence 400.

Because current distortion is only significantly introduced near intersection points of input voltages $v_a$, $v_b$, and $v_c$, high-quality switching sequence 300 is used when the line-line voltages are within the predetermined voltage range 504 range surrounding intersection point 502 to mitigate and/or reduce the current distortion. When the line-line voltages are not within the predetermined voltage range 504, high-efficiency switching sequence 400 is applied to achieve the highest-efficiency operation of CSR 100. By using a combination of high-efficiency and high-quality switching sequences 300, 400, adaptive switching sequence 500 facilitates capitalizing on the efficiency benefits from reduced switching losses while mitigating side effects, thereby preserving (or even improving) the high power-factor/low-distortion input characteristics of CSR 100.

Figure 6:
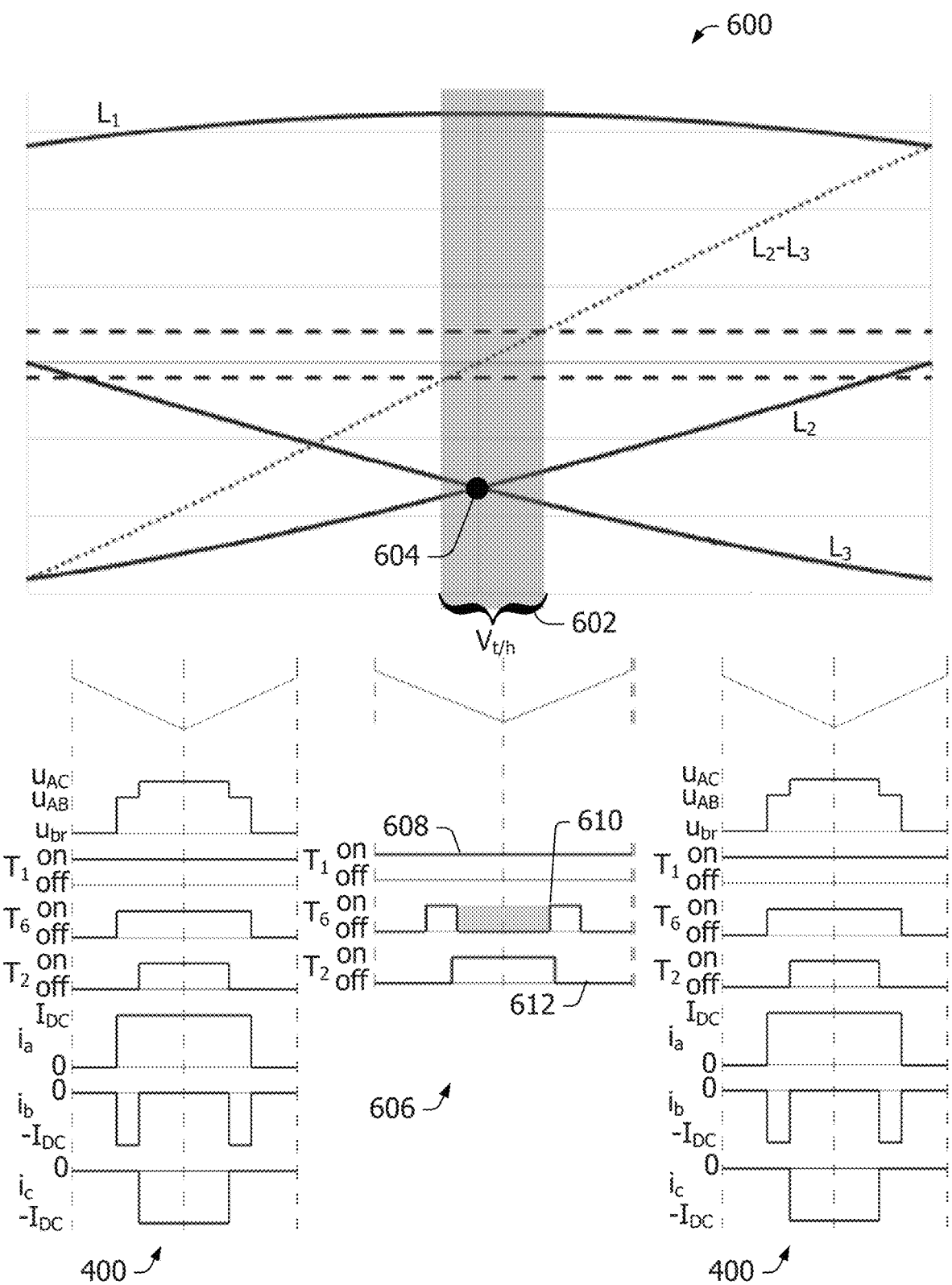
FIG. 6 illustrates an alternative adaptive switching sequence for use in controlling the CSR shown in FIG. 1.

FIG. 6 illustrates an adaptive switching sequence 600 for use in controlling CSR 100 (shown in FIG. 1). CSR 100 is initially driven using high-efficiency switching sequence 400 (shown in FIG. 4). The line-line capacitor voltages across input capacitors $C_i$ are monitored by controller 130 (shown in FIG. 1). To enable controller 130 to determine which switching sequence to apply, a predetermined voltage range 602 is defined in a memory of controller 130 using hysteresis. Controller 130 determines whether the measured input voltages fall within predetermined voltage range and selects which of the switching sequences to apply to switches 112 based on the outcome of the determination. Predetermined voltage range 602 ensures correct selection of a switching sequence irrespective of ripple on capacitor voltage and/or line voltage distortion. Additionally, controller 130 determines which sector of a plurality of predefined sectors (shown in FIG. 2) the measured input voltages fall within. The determined sector indicates which of switches 112 are commutated during switching sequences 300, 400.

When the voltages of the two active legs T6 and T2 approach an intersection point 604 (signaled by the line-line voltages approaching zero), controller 130 changes the switching sequence being applied from high-efficiency switching sequence 400 to an alternative high-quality switching sequence 606.

In the exemplary embodiment, alternative high-quality switching sequence 606 includes switching state signals 608, 610, 612 for each of switches 112 T1, T6, T2, respectively. Substantially, the pulse signals 610, 612 on active legs T6, T2 are not overlapping, in order to avoid the issues related to the voltage sliding intersection.

Switching ripple on the capacitor voltage or distortion on the line voltage causes multiple consecutive sub-phase-sector changes to occur in the SVM analysis. Alternative high-quality switching sequence 606 mitigates the losses present near intersection point 604 by applying the non-overlapping pulse signals 610, 612 while the sub-phase-sector is locked.

After crossing intersection point 604 and exceeding predetermined voltage range 602, controller 130 changes the applied switching sequence back to high-efficiency switching sequence 400.

In one embodiment, CSR 100 may be used as a front-end rectifier in double-conversion AC UPS applications. In another embodiment, CSR 100 may be used as a rectifying stage of DC UPS.

Additionally, alternative topologies performing as a current source at the input (e.g. matrix converters) may also benefit (to some extent) from the disclosed invention.

Exemplary embodiments of systems and methods for current source converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) increasing operating efficiency of CSRs and/or UPSs; (b) improving input power quality for CSRs; (c) reducing current distortion injected into CSRs near intersection points of the three-phases of input voltages; and (d) reducing component stress in CSRs such as switching overvoltage on power semiconductors.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A current source rectifier (CSR) system for a power source including three phase lines, the CSR system comprising:
   a rectifier operable to receive an alternating current (AC) input voltage and provide a direct current (DC) output voltage, the rectifier comprising first, second, and third phase legs coupled between a positive line and a negative line and including a plurality of switches, each switch of the plurality of switches coupled to an associated phase line of the three phase lines of the power source; and
   a controller communicatively coupled to the rectifier and operable to (i) control operation of the plurality of switches in accordance with a first switching sequence when measured input voltages on at least two phase lines of the three phase lines are outside of a predetermined voltage range and (ii) control operation of the plurality of switches in accordance with a second switching sequence when measured input voltages on at least two phase lines of the three phase lines are within the predetermined voltage range;
   wherein controlling operation of the plurality of switches in accordance with at least one of the first and second switching sequences comprises (i) locking a switch, connecting to one of the positive line and the negative line, from one of the first, second, and third phase legs in an ON position and (ii) commutating a switch, connecting to an opposite one of the positive line and the negative line in comparison to the locked switch, from each of the two remaining phase legs while the locked switch remains in the ON position for the duration of the switching sequence used to control operation of the plurality of switches, wherein each of the commutated switches is switched only at different times from other commutated switches.

2. The CSR system of claim 1, wherein the first switching sequence is a switching sequence configured to improve efficiency of the CSR system, and wherein the second switching sequence is a switching sequence configured to reduce current distortion associated with the CSR system.

3. The CSR system of claim 2, wherein the controller is further configured to operate the plurality of switches in accordance with an adaptive switching sequence comprising the first and second switching sequences.

4. The CSR system of claim 3, wherein the adaptive switching sequence operates to apply the first and second switching sequences to facilitate efficiency benefits of reduced switching losses from the first switching sequence while maintaining high power-factor and low-distortion input characteristics of the CSR system.

5. The CSR system of claim 3, wherein to control operation of the switches in accordance with the first and second switching sequences, the controller is further configured to define, in a memory of the controller, the predetermined voltage range using hysteresis.

6. The CSR system of claim 5, further comprising at least one sensor coupled across a plurality of input filter capacitors.

7. The CSR system of claim 6, wherein the predetermined voltage range accounts for at least one of voltage ripple on the plurality of input filter capacitors and phase line voltage distortion.

8. A rectifier circuit comprising:
   a three phase power source to supply an alternating current (AC) input voltage over first, second, and third phase lines of the power source;
   a load to be supplied with a direct current (DC) output voltage;
   a rectifier coupled between the power source and the load, the rectifier comprising:
      a first phase leg comprising first and second series-coupled switches coupled between a positive line and a negative line, wherein a first node coupled to the first phase line of the power source is directly connected between the first switch and a cathode end of a first diode;
      a second phase leg comprising third and fourth series-coupled switches coupled between the positive line and the negative line, wherein a second node coupled to the second phase line of the power source is directly connected between the third switch and a cathode end of a second diode; and a third phase leg comprising fifth and sixth series-coupled switches coupled between the positive line and the negative line, wherein a third node coupled to the third phase line of the power source is directly connected between the fifth switch and a cathode end of a third diode; and a controller communicatively coupled to the rectifier and configured to:

define a predetermined voltage range in a memory of the controller by hysteresis;

control operation of the first, second, third, fourth, fifth, and sixth switches in accordance with a high-quality switching sequence when measured input voltages on at least two of the first, second, and third phase lines are outside of the predetermined voltage range, wherein the high-quality switching sequence includes a freewheeling state following each switching pulse; and control operation of the first, second, third, fourth, fifth, and sixth switches in accordance with a high-efficiency switching sequence when measured input voltages on at least two of the first, second, and third phase lines are within the predetermined voltage range, wherein the high-efficiency switching sequence minimizes activation of the freewheeling diode.

9. The rectifier circuit of claim 8, wherein the controller is further configured to:

lock at least one of the first and second switches in an ON position for the duration of the first or second switching sequence;

commutate at least one of the third and fourth switches; and commutate at least one of the fifth and sixth switches.

10. The rectifier circuit of claim 8, further comprising at least one sensor coupled across a plurality of input filter capacitors.

11. The rectifier circuit of claim 10, wherein the controller is further configured to determine the switching sequence to apply in response to measuring phase voltages by the at least one sensor.

12. The rectifier circuit of claim 11, wherein the first switching sequence is a switching sequence configured to improve efficiency of the rectifier circuit.

13. The rectifier circuit of claim 12, wherein the second switching sequence is a switching sequence configured to reduce current distortion.

14. A current rectification system comprising:

a rectifier operable to receive an alternating current (AC) input voltage from a three phase power source and to provide a direct current (DC) output voltage to a load, the rectifier comprising:

a first phase leg comprising first and second series-coupled switches coupled between a positive line and a negative line, wherein a first diode is coupled between the first and second series-coupled switches and the positive line;

a second phase leg comprising third and fourth series-coupled switches coupled between the positive line and the negative line, wherein a second diode is coupled between the third and fourth series-coupled switches and the positive line; and a third phase leg comprising fifth and sixth series-coupled switches coupled between the positive line and the negative line, wherein a third diode is coupled between the fifth and sixth series-coupled switches and the positive line;

an input filter coupled between the power source and the rectifier, the input filter comprising a plurality of input filter capacitors coupled between three phase lines of the power source and a mid-point node; and at least one sensor coupled to the input filter to measure a phase voltage for each of the three phase lines of the power source, wherein a predetermined voltage range in a memory of the controller is defined by hysteresis and determines a switching sequence of the first, second, third, fourth, fifth, and sixth switches, and wherein an extent of the predetermined voltage range is selected to account for voltage ripple on the plurality of input filter capacitors and line voltage distortion of the three phase lines.

15. The current rectification system of claim 14, wherein a first node coupled to a first phase line of the three phase lines of the power source is directly connected between the first switch and a cathode end of a fourth diode, wherein a second node coupled to a second phase line of the three phase lines of the power source is directly connected between the third switch and a cathode end of a fifth diode, and wherein a third node coupled to a third phase line of the three phase lines of the power source is directly connected between the fifth switch and a cathode end of a sixth diode.

16. The current rectification system of claim 14, wherein the at least one sensor is a component of the input filter.

17. The current rectification system of claim 14, wherein the at least one sensor is coupled across the plurality of input filter capacitors of the input filter.

18. The current rectification system of claim 14, further comprising a controller communicatively coupled to the input filter.

19. The current rectification system of claim 18, wherein the controller is also communicatively coupled to the rectifier and is operable to:

control operation of the first, second, third, fourth, fifth, and sixth switches in accordance with a first switching sequence when measured phase voltages on at least two phase lines of the three phase lines are outside of the predetermined voltage range, and control operation of the first, second, third, fourth, fifth, and sixth switches in accordance with a second switching sequence when measured phase voltages on the at least two phase lines of the three phase lines are within the predetermined voltage range.

20. The current rectification system of claim 19, wherein the input filter is configured to prevent output of high-frequency switching harmonics to the rectifier and to provide feedback to the controller for use in determining whether the first switching sequence or the second switching sequence should be used to control operation of the first, second, third, fourth, fifth, and sixth switches.

* * * * *